United States Patent [19]

Wetzel

[11] Patent Number: 4,577,511

[45] Date of Patent: Mar. 25, 1986

[54] AIR LINE PRESSURE TESTER

[76] Inventor: Donald C. Wetzel, c/o Quest Corporation, 9009 Freeway Dr., Macedonia, Ohio 44056

[21] Appl. No.: 667,971

[22] Filed: Nov. 5, 1984

[51] Int. Cl.⁴ ............................................. G01L 19/14
[52] U.S. Cl. ........................................ 73/756; 73/431
[58] Field of Search ................................. 73/756, 431

[56] References Cited

U.S. PATENT DOCUMENTS 3,178,944  4/1965  Templeton ............................ 73/756

Primary Examiner—Donald O. Woodiel

Attorney, Agent, or Firm—Pearne, Gordon, Sessions, McCoy, Granger & Tilberry

[57] ABSTRACT

A device for gauging the air pressure in a train-line at a hose coupling thereon having a pair of mated connectors containing resilient gaskets on the ends of the hoses in sealing engagement with each other includes an air pressure gauge, a ring-like member supporting the gauge therein, and means for sampling the air pressure in the train-line mounted on the ring-like member and providing fluid communication between the train-line and the gauge. A handle is attached to the ring-like member and is operable by applying a force thereon to position a distal portion of the sampling means in the train-line without stressing the air pressure gauge.

11 Claims, 3 Drawing Figures

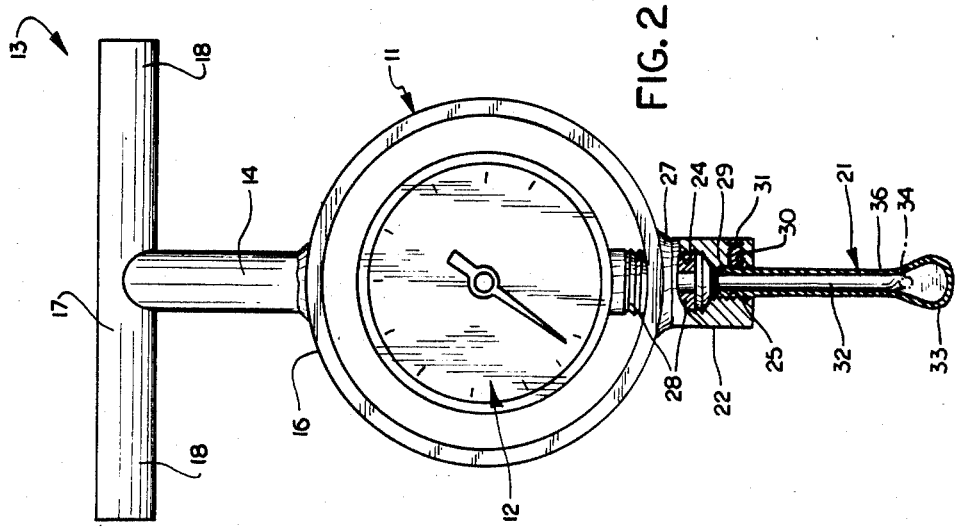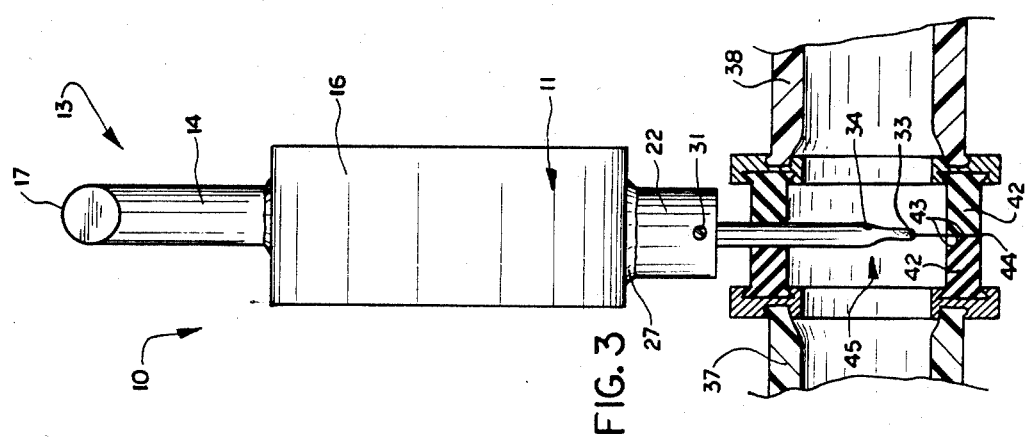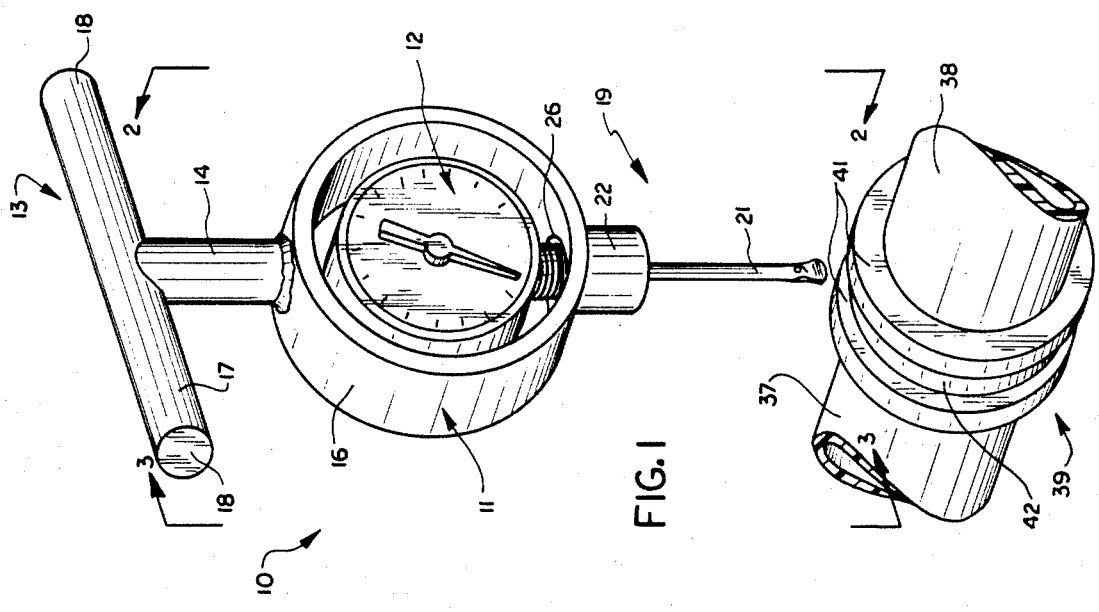

AIR LINE PRESSURE TESTER

BACKGROUND OF THE INVENTION

The present invention relates generally to gauges, and more particularly to air pressure gauges for use with railroad train-lines.

PRIOR ART

A train of railroad cars typically utilizes an air brake system having a plurality of serially connected air lines, commonly referred to as the "train-line," extending the full length of the train. The air line on each railcar is in fluid communication with and connected to an air line on each adjacent railcar by a hose coupling mechanism, so that a segmented main air line is formed along the entire length of the train, yet is severable between any two connected cars. Normally, a train-line is charged with a predetermined air pressure which releases the brakes, and such pressure must be maintained for safe operation of the train.

Before a train can be dispatched from a yard, numerous tests must be performed to verify particular functional operations of the train. One such verification test is for train-line pressure integrity throughout the entire train. Although an allowable pressure drop between the front and rear of the train is permitted, whenever the pressure drops below a standard level, the location of the leak must be determined and repairs made or the railcar or cars with a defective section of the train-line must be removed from the train.

One method for determining train-line pressure is to observe an air pressure gauge reading located at the rear end of the train or attached to the last air hose on the last car. By knowing the air pressure level introduced at the lead end or head of the train and observing the end-of-train gauge measurement, the total train-line pressure drop can be determined. The difficulties with this method are numerous, particularly the fact that there is no way of knowing the precise location of a leak. This is especially difficult when the out-of-specification pressure drop is due to a plurality of small leaks which cumulatively bring the total pressure drop below the minimum standard.

To isolate the source or sources of pressure loss in the train-line, it has been necessary to separate the air hoses and install a temporary gauge at various points along the length of the train-line. This involves closing the air valves on two adjacent railcars, decoupling the air hoses interconnecting the two cars, and attaching an air gauge to the glad-hand connector on the leading hose. The respective air valve on the forward car is opened again, and the pressure reading of the gauge is noted. Thereafter, the continuity of the train-line is restored by reclosing the lead car air valve, disconnecting the air gauge, recoupling the adjacent railcar air hoses, and again opening the air valves on either side of the point of measurement to re-establish pressure in the line. This process is continued until enough cars are isolated and removed so that the minimum specified pressure is maintained through the entire train-line. The process is very costly and time-consuming in terms of both manpower and delay in preparing the train for departure, and can be dangerous since trapped air can cause a hose to "kick" and injure the car inspector.

There are devices which drive a needle or thin spade down between the sealing gaskets in the air hose couplers. The needle is connected to an air pressure gauge, and thus the need to decouple the air hoses is obviated. One such device is described in U.S. Pat. No. 3,178,944, issued to Templeton.

The difficulties encountered with the devices known heretofore include the fact that the needle guide cannot be easily constructed to accept all the various exterior shapes of the air hose couplers presently in use. Furthermore, under low temperature conditions, the sealing gaskets lose their resiliency and become very hard, and insertion of the needles with any of the devices known heretofore is nearly, if not completely, impossible.

SUMMARY OF THE INVENTION

The present invention provides a new and useful device for inserting a pressure sampling mechanism into an air line and measuring the pressure therein.

According to one aspect of the invention, a device is shown which accurately measures the pressure in an air line, such as a train-line of a railroad train air brake system, at the air hose couplings without necessitating the decoupling of the hoses and without a substantial loss of air from the air line.

According to another aspect of the invention, a structure is provided which supports an air gauge in fluid communication with a pressure sampling mechanism, whereby a force can be directly applied to the sampling mechanism to position the same within the pressurized air line, without directly applying stress to the air pressure gauge.

According to another aspect of the invention, a handle is provided which can be manually grasped and acted thereon to force the pressure sensing mechanism between the sealing gaskets at an air line coupling.

According to yet another aspect of the invention, a device for testing air line pressure is made of high strength materials which can be used under extreme environmental conditions such as cold temperatures.

According to still another aspect of the invention, a device is disclosed which provides both an improved and simplified means for inserting a pressure sampling mechanism into an air line and also protects the pressure gauge from handling and storage damage.

Another aspect of the invention is a device which allows easy replacement of the pressure sampling mechanism without further disassembly of the device.

These and other aspects of the invention and advances in the art will be more fully understood in view of the following specification and drawings.

In general, a device for determining air pressure in an air line at a hose coupling thereon having a pair of connectors containing resilient gaskets on the ends of the hoses in sealing engagement with each other includes gauge means for measuring air pressure, a protective member supporting the gauge means therein, and means for sampling air pressure in the air line mounted on the protective member and providing fluid communication between the air line and the gauge. A handle is provided on the protective member and coacts with the protective member to transfer a force applied on the handle to the sampling means to position the sampling means in fluid communication with the air line without the force being applied to the gauge means.

BRIEF DESCRIPTION OF THE DRAWINGS

FIG. 1 is a perspective view of a device embodying the concepts of the present invention as it would be used at an air hose coupling on a train-line just prior to insertion;

FIG. 2 is a plan view of the device shown in FIG. 1, with a pressure-sensing assembly shown in section along line 2—2 of FIG. 1, the train-line coupling being omitted for clarity; and;

FIG. 3 is a side elevational view of the device shown in FIG. 1 in use with a train-line air hose coupler after insertion, and showing the air hose coupling on the train-line in partial section along line 3—3 in FIG. 1.

DETAILED DESCRIPTION OF THE PREFERRED EMBODIMENTS

A device which embodies the concepts of the present invention is shown in FIG. 1 and generally indicated by the numeral 10. Such a device includes a protective rigid frame member 11 which preferably is a ring-like member formed from a portion of metal tubing. Ring 11 acts to both support a conventional air pressure gauge 12 and to protect the gauge should the device be accidentally dropped or otherwise impacted.

A handle 13 is attached to ring 11, and includes a shaft portion 14 which extends generally radially from an outer surface 16 of ring 11 and a grip portion 17 fixedly attached to the end of shaft 14 opposite ring 11 by any convenient means, such as welding. Grip 17 is transversely attached to shaft 14 and generally intermediate each end 18 of grip 17. This design allows an operator to grasp handle 13 on either end 18 and apply a force thereto in a direction generally along the longitudinal axis of shaft 14. Shaft 14 is firmly attached to ring 11 by any convenient means, such as welding.

Mounted to ring 11 in a diametrically opposed relationship to handle 13 is a pressure sampling assembly 19 which includes a tip 21 and a gauge extension 22. Thus, ring 11 supports conventional air pressure gauge 12 in fluid communication with sampling assembly 19, as will be more fully described hereinbelow.

Referring to FIG. 2, gauge extension 22 is a pipe boss provided with two contiguous and colinear axial bores 24 and 25 through the respective ends of extension 22. An opening 26 (FIG. 1) is made in ring 11 through which gauge extension 22 can slip fit. Extension 22 is partially inserted into hole 26 of ring 11 and then welded about the perimeter of hole 26, as at 27, so that gauge extension 22 extends radially from ring 11, and is generally diametrically opposed to shaft 14. Preferably, shaft 14 and gauge extension 22 are axially colinear with each other. Central bore 24 is tapped and appropriately sized to accept a threaded mounting plug 28 on pressure gauge 12. Pressure gauge 12 may be any convenient gauge available, such as an Ashcroft spring-suspended movement gauge, Type 1003, manufactured by Ashcroft Instrument Division, Stratford, Conn.

Gauge 12 is threaded onto extension 22 via bore 24 and the thread seams may be sealed with any convenient sealant. As shown in the drawings, gauge 12 is thus mounted within the protective ring 11, which tends to prevent damage to the gauge during handling.

Bore 25 is contiguous and colinear with bore 24, thereby forming a continuous fluid conduit through extension 22. Bore 25 is tapped and appropriately sized to accept a threaded end 29 of pressure sensing tip 21. A small transverse hole 30 is drilled and tapped through a wall of extension 22 intermediate bore 25. Hole 30 accepts a setscrew 31 used to secure tip 21 in bore 25 and prevent the tip from rotating or backing out.

Still referring to FIG. 2, tip 21 is hollowed out, having an axial channel 32 bored therethrough from a distal end 33 to and through threaded end 29. Preferably, tip 21 is spade-shaped, being somewhat flattened towards its distal end 33. A fluid inlet hole 34 is located generally transversely through a wall 36 of tip 21 near distal end 33. Hole 34 extends all the way through wall 36 and opens into channel 32.

When assembled, tip 21 is threadably engaged with extension 22, setscrew 31 is tightened, and gauge 12 is also threaded onto extension 22 and mounted within protective ring 11. Thus, a continuous path of fluid communication is formed from transverse hole 34, through channel 32 in tip 21, on through contiguous bores 26 and 24 and into gauge 12 via mounting plug 28. When device 10 is fully assembled, the distal end of tip 21 with fluid inlet 34 therein is in sealed fluid communication with gauge 12.

As best shown in FIG. 1, pressure sampling assembly 19 is generally axially aligned with shaft 14 so that a force applied to shaft 14 via handle grip 17 will be axially applied to tip 21 via ring 11. Tip 21 is rigidly mounted to protective ring 11 by gauge extension 22, and handle 13 is rigidly mounted on ring 11 as described hereinabove so that handle 13 and ring 11 coact to transmit a force applied on handle 13 to tip 21, without forces being directly applied to or through the gauge 12. Tip 21 is not directly mounted on gauge 12 but rather is mounted on extension 22 so that any excessive forces applied to tip 21 impact extension 22 and ring 11, not gauge 12. This design thus provides maximum protection for gauge 12 which is a sensitive measuring device. Thus, ring 11 independently supports gauge 12 in fluid communication with pressure sensing assembly 19.

The gauge extension design also allows for easy replacement of tip 21 by simply backing out setscrew 31 partially and unscrewing the tip should the tip become bent, clogged or otherwise unusable, without disassembling the rest of the device.

Referring to FIGS. 1 and 3, device 10 is preferably adapted to be used at a hose coupling on a pressurized air line, for example, a train-line in a railroad train air brake system. Such a system includes air hoses 37 and 38 (partially shown in FIGS. 1 and 3) which are sealably joined together by a conventional coupler 39 such as glad-hand connectors.

As shown in FIG. 3, coupler 39 typically includes mateable connectors 41 which cooperate to join air hoses 37 and 38 together in sealed fluid communication with each other. Connectors 41 contain resilient annular sealing gaskets 42 which are located on the adjacent ends of air hoses 37 and 38, respectively. When connectors 41 are mated together, the annular and radially directed opposed surfaces 43 of gaskets 42 are sealably engaged and allow fluid communication between hoses 37 and 38 without loss of pressure. Such a coupler 39 is typically used to join the air lines of two adjacent train cars.

In operation, the air line pressure tester described hereinabove is used as follows. The operator grasps device 10 by the handle grips 18 and places distal end 33 of tip 21 at the interface 44 between sealing gaskets 42. By applying a force on handle 13 generally axial with shaft 14 and tip 21, tip 21 is pushed between the engaged faces of gaskets 42 so that distal end 33 is positioned within the train-line, as at 45 (FIG. 3). Thus, pressure sensing assembly 19 provides fluid communication between the train-line and gauge 12. The flattened spade-shape at tip 21 eases the insertion process. The resilient nature of sealing gaskets 42 and the generally flat spade shape of tip 21 permit the positioning of tip 21 between the sealing surfaces 43 without a major loss of air pressure.

Positioning distal end 33 of pressure sampling assembly 19 within the train-line exposes transverse hole 34 to the pressurized air contained therein. Since hole 34 is in fluid communication with pressure gauge 12, the air pressure in the train-line is sampled and the gauge indicates the train-line pressure. After the reading is taken, the operator can disengage device 10 from the hose coupling 39 by pulling or otherwise applying a force on handle 13 so as to extract tip 21 from the train-line.

The aforementioned design is particularly convenient from an assembly viewpoint in that many of the various parts can all be made from high strength metal tubing or rods, for example, aluminum stock. These parts, such as ring 11, handle 13, and extension 22, can be finished with black anodize to prevent corrosion and other deleterious environmental effects. Tip 21 preferably is made of steel with a polished surface to ease insertion. The rigidity of a spade tip and the leverage provided by the handle make it possible to insert the tip under low temperature conditions.

The use of such materials yields a strong, sturdy and reliable device which can be used for air line pressure testing under extreme environmental conditions, such as low temperatures. The handle and protective ring provide means for inserting the tip without applying stress to the gauge mechanism.

While the preferred embodiment has been shown and described in the accompanying drawings and specification, it is clear that numerous modifications and changes in detail are within the scope of the present invention. For example, protective ring 11 need not be annular and can be provided with clear protective coverings across the open faces thereof to provide added protection to the gauge. Also, handle 13 could be attached on either side of ring 11 transversely of the pressure sampling assembly 19, thereby obviating the need for shaft 14. In yet another embodiment, a triangular shovel-like handle support is used with the pressure gauge protruding straight up from extension 22 and into the triangle-shaped area formed by the handle legs. In this case, extension 22 can be made axially longer to provide a grip area, much like a shovel spade is used.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A device for determining air pressure in an air line at a hose coupling thereon having a pair of connectors containing resilient gaskets on the ends of the hoses in sealing engagement with each other, said device comprising:
   means for gauging air pressure;
   a protective member supporting said gauge means therein;
   means for sampling air pressure in the air line, said sampling means being mounted on said protective member and extending outwardly therefrom, having a distal portion adapted to pass between said gaskets at a sealing interface thereof and into said air line, said sampling means providing fluid communication between said air line and said gauge means;
   handle means on said protective member, said handle means and protective member coacting a transfer a force applied on said handle means to said sampling means to position said distal portion in fluid communication with said air line without the force being applied to said gauging means.

2. A device according to claim 1, wherein said sampling means includes a hollow longitudinal tip extending radially from said protective member, said handle means being attached to said protective member transversely of said tip.

3. A device according to claim 2, wherein said sampling means further comprises a boss rigidly mounted on said protective member, said gauge means being attached to one end of said boss and said tip being attached to an opposite end of said boss, said boss providing fluid communication between said gauge means and said tip.

4. A device according to claim 3, wherein said tip is individually removable from said boss without further disassembly of the device.

5. A device according to claim 3, wherein said handle means, protective member, boss, and said sampling means form a rigid structure for inserting said sampling means into the air line by applying a force on said handle and transferring said force to said sampling means independently of said gauge means.

6. A device according to claim 1, wherein said handle means includes a shaft extending radially from said protective member and is rigidly attached at one end to said protective member diametrically opposed to said sampling means, said shaft carrying a grip portion on an opposite end thereof.

7. A device for gauging air pressure in a train-line at a hose coupling thereon having a pair of mated connectors joining resilient gaskets on the ends of the hoses in sealing engagement with each other, said device comprising:
   gauge means for air pressure;
   a ring-like member adapted to rigidly support said gauge means therein;
   means for sampling air pressure in the train-line, said sampling means being rigidly mounted on said ring-like member and extending radially outward therefrom, said sampling means having a distal portion adapted to slip between the sealingly engaged gaskets into the train-line, said sampling means providing fluid communication between said gauge means and said train-line; and
   a handle rigidly on said ring-like member operable to position said distal portion in the train-line.

8. A device according to claim 7, wherein said distal portion is a hollow longitudinal tip radially extending outwardly from said ring-like member and said handle includes a shaft portion extending radially from said ring-like member and diametrically opposed to said tip and having a transverse grip portion attached to the free end of said shaft.

9. A device according to claim 8, further comprising a gauge extension rigidly attached to said ring-like member and having said gauge means attached at one end and said tip attached at an opposite end whereby said handle, ring-like member, and gauge extension form a rigid structure operable to insert said distal portion into said train-line preventing insertion forces being applied to said gauge means.

10. A device according to claim 7, further comprising shield means attached to said ring-like member whereby said gauge means is completely enclosed.

11. A device for determining air pressure in an air line at a hose coupling thereon having a pair of connectors containing resilient gaskets on the ends of the hoses in sealing engagement with each other, the device comprising means for gauging air pressure, a protective member supporting said gauge means, means on said protective member for sampling air pressure in the air line and providing fluid communication between the air line and said gauge means, and handle means on said protective member, said handle means and protective member coacting to transfer a force applied to said handle means to said sampling means to position a portion of said sampling means in the air line whereby said force is applied to said sampling means independently of said gauge means.

* * * * *